United States Patent [19]

Theimer et al.

[11] 4,016,301

[45] Apr. 5, 1977

[54] ELECTRICALLY CONDUCTIBLE GELLABLE COMPOSITION WITH IONIZED SALT

[75] Inventors: Ernst Theodore Theimer, Rumson; George E. Heinze, East Brunswick, both of N.J.

[73] Assignee: Lectrofood, Inc., East Brunswick, N.J.

[22] Filed: Apr. 12, 1976

[21] Appl. No.: 676,392

Related U.S. Application Data

[63] Continuation-in-part of Ser. No. 446,822, Feb. 28, 1974, Pat. No. 3,966,972.

[52] U.S. Cl. .............................. 426/573; 426/575
[51] Int. Cl.$^2$ ......................................... A23L 1/04
[58] Field of Search .......... 426/573, 575, 244, 246; 252/518

[56] References Cited

UNITED STATES PATENTS

| | | | |
|---|---|---|---|
| 2,785,075 | 3/1957 | Malecki | 426/573 |
| 3,752,678 | 8/1973 | Jenkinson et al. | 426/573 |
| 3,769,035 | 10/1973 | Kleiner et al. | 426/244 |
| 3,873,742 | 3/1975 | Miyahara | 426/244 |

*Primary Examiner*—Jeanette M. Hunter
*Attorney, Agent, or Firm*—Arthur L. Liberman

[57] ABSTRACT

An edible electrical conducting jellable composition for use on foods to be cooked by electricity and which forms a continuous phase on setting containing water, a gum and an ionized salt.

3 Claims, 12 Drawing Figures

FIG. 11
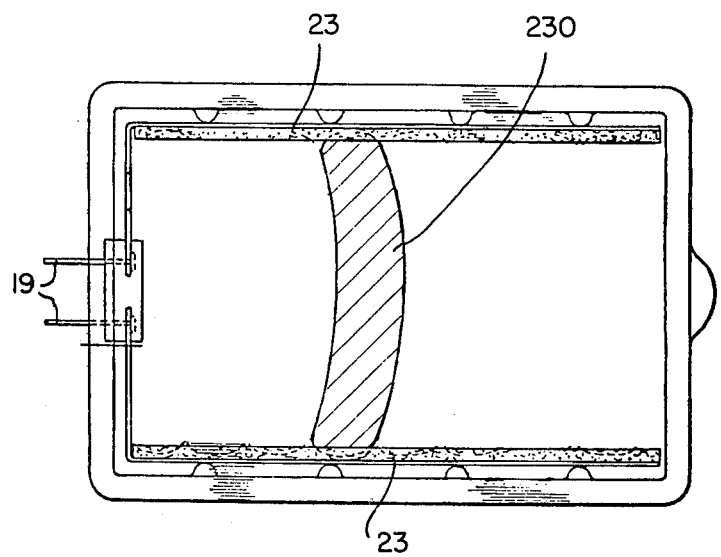
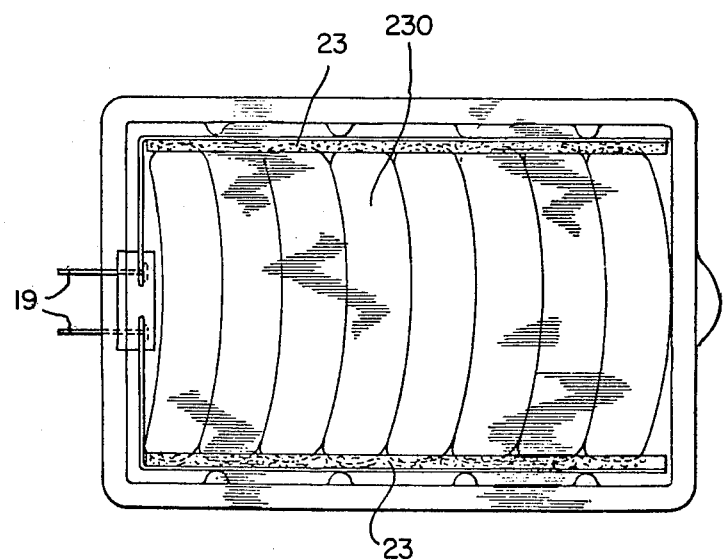
FIG. 12

ELECTRICALLY CONDUCTIBLE GELLABLE COMPOSITION WITH IONIZED SALT

This application is a continuation-in-part of U.S. application for Letters Patent Ser. No. 446,822, filed on Feb. 28, 1974, now U.S. Pat. No. 3,966,972.

BACKGROUND OF THE INVENTION

This invention relates to a composition consisting essentially of a gel and a substantially ionized species useful in conjunction with an edible electrically high conducting food substance capable of being heated by means of the application thereto of electrical energy having:

a. Substantially diametrically opposite ends;
b. At least one substantially solid surface;
c. At least two electrical contacts located at said food substance, and in contact with said substantially solid surface; and
d. At least a substantially portion of said substantially solid surface having in intimate contact therewith, and as an integral portion thereof the said composition consisting essentially of:
 i. A gel; and
 ii. A substantially ionized species said composition also being positioned to make intimate contact between the electrically high conducting food substance and the electrical contacts whereby the contact is rendered non-arcing when an electromotive force is applied to said electrical contacts. This invention is applied to a unit food package such as a unit sausage (e.g. frankfurter), pizza, hamburger, of cheeseburger package and more particularly to a unit moisture-containing compound food package in which an electrically conducting food such as a frankfurter, which is in intimate contact and within or upon a suitable non-electrically conductive food substance such as a bun, may be cooked without arcing occurring and caused to remain conveniently hot throughout and palatable for a convenient period of time after cooking. This invention also relates to the container used for enclosing the electrically non-conducting food and electrically conducting food, the said container being an integral part of said compound food unit.

BACKGROUND: DESCRIPTION OF THE PRIOR ART

The cooking of an electrically conducting food substance by passing an electrical current therethrough, i.e., by means of electrical resistance cooking, is known, as shown by the following United States patents:

U.S. Pat. No. 3,651,752, incorporating by reference application for U.S. Letters Patent, Ser. No. filed June 30, 1969.

Inventor: Roslonski discloses: a packaged food product such as a frankfurter having a wrapper. The wrapper ends have two separate conducting strips which contact two portions of the food substance for cooking same. The wrapper is sealed about the ends of the food substance allegedly to insure good electrical contact between the conducting strips and the food substance.

U.S. Pat. No. 2,939,793.

Inventor: Richman discloses: a frankfurter package unit including a frankfurter axially confined in a wrapper, the frankfurter having its pulp portion exposed at both ends at right angles to its longitudinal axis within the wrapper, the wrapper consisting of sealed end portions formed of flexible metallic electrical conducting material secured at opposite end portions to a central non-conducting wrapper material, the trimmed ends of the frankfurter being in juxtaposition to the sealed metallic conductor ends of the wrapper whereby the frankfurter can be cooked without removing the wrapper, by insertion of the entire package intermediate to a pair of electrodes and applying electrical current through the electrodes in sufficient amount to heat the frankfurther without the electrodes perforating the wrapper.

U.S. Pat. No. 3,548,738.

Inventor: McDevitt discloses: a hot dog vending machine including a cold food storage compartment, a pair of vertically spaced actuating bars and a composite hot dog — electrode cooking package stored within the food compartment with special emphasis on the nature of the package, which package includes a pair of spaced electrodes each of whcih is bonded to the hot dog and retained within a cylindrical cardboard container previously formed for operation in the machine and cooperating with the spaced actuating bars. The electrodes may be in the form of end caps which fit in intimate contact over the ends of the frankfurter and which do not puncture the frankfurter. See Column 3, lines 60–66.

U.S. Pat. No. 3,886,290

Issue Date: May 27, 1975

Inventors: Ernst Theodore Theimer; Donald Joseph Roslonski discloses: a packaged food product comprising:

a. An electrically low conducting food;
b. An electrically high conducting food disposed in proximate contact with said low conducting food;
c. Said high conducting food having two axially polar high conducting food portions having external surfaces and extending outwardly beyond said low conducting food;
d. Enclosing said low conducting food, a hollow thermally insulating substantially moisture-impervious container for holding said electrically low conducting food, said container being capable of existing in a closed position and in an open position, said container comprising two sections having substantially conterminous edges, a first section and a second section articulating said first section, said first section and said second section having mutually substantial continuous co-extensive edges, at least of one said sections having an internal surface designed to fixedly hold said food over a substantial portion of the surfaces of said food when the container is in a closed position;
e. At least one of said container sections having axially polar ends, said axially polar ends having internal axially polar surfaces which are co-extensive with the external surface of said axially polar high conducting food portions;
f. Electrical conducting means extending outwardly from said container, said electrical conducting means having electrical conducting ends external to said container, said ends being designed to make electrical contact with the terminals of an electrical energy source when said container is in a closed position, said electrical conducting means being affixed to each of said internal axially polar surfaces, said electrical conducting means being in intimate electrical contact with the external surfaces of said two axially polar high conducting food portions when said container is in a closed position.

One of the principal advantages of this type of electrical resistance cooking is the relatively short period of time required for conducting food substances to be effectively cooked thereby. Accordingly, electrical resistance cooking has been taught to be employed preferentially in food dispensing machines where speed of cooking is particularly desirable.

One of the most common conducting food substances cooked by electrical resistance cooking in dispensing machines is the frankfurter. Prior to the above-named invention of Theimer and Roslonski, a frankfurter pierced at each end by an electrode was cooked by passing an electrical current between the electrodes. Usually, the frankfurter is disposed within a bun, and the resulting sandwich enclosed by a wrapping having suitable openings for admitting the electrodes therein. The principal disadvantage of employing a package of this type is that the food substances within the package are exposed to the surrounding atmosphere and thus subject to contamination.

One solution to this problem was to enclose associated conducting and non-conducting food substances, i.e. a frankfurter and bun, in a wrapper having conducting portions which contact the conducting food substance so that electrical current may be passed through such substance without disturbing the integrity of the wrapper. A packaged food product of this type is disclosed in Richman U.S. Pat. No. 2,939,793. However, new problems were posed by this packaging technique, namely the difficulty of maintaining good electrical contact between the conducting portions of the wrapper and the conducting food substance and the unacceptable arcing and resultant burning which occurred during the cooking operation. One solution to this problem, offered in the aforementioned Richman patent, was to lay bare as by peeling the ends of the conducting food substance to expose the inner portions thereof. Such exposed inner portions are then placed in intimate contact with the conducting portions of the wrapper.

However, this solution is essentially inoperable using the method described in Richman, and further, using the technique described in Roslonski, or that shown in FIG. 9 of McDevitt since the contact area (in each of the disclosures) between electrode and frankfurter is too small to permit rapid cooking without charring of the meat. In addition, baring the ends of the frankfurter as done by Richman, is a costly, unhygienic and superfluous operation. Further, encasing each end of both the conducting food and non-conducting food (which encloses the conducting food), as described in Roslonski, leads to inefficiency and inconvenience to the consumer of the product. A further disadvantage when using the Roslonski product is that some of the foil may adhere to the food product when the package is opened for eating. The electrode caps of McDevitt (FIG. 9) must be removed prior to removal of the food product from the McDevitt vending machine. This aspect of McDevitt leads to much inconvenience on the part of both the vendor and the vendee of the McDevitt food unit.

Another solution offered by the Theimer and Roslonski invention partly solved the foregoing problems but did not completely obviate the problem of arcing and resultant burning during the electrical resistance cooking operation.

U.S. Pat. No. 3,062,663
Inventor: Furgal, et al.

discloses: a food package which may readily be connected to a conventional electrical outlet for the heating of food (e.g. frankfurter) contained therein, whereby the food package comprises a container formed by an electrically non-conductive material, a pair of low resistance strip electrodes in longitudinally-spaced apart relation within said container, said electrodes having portions therein projecting through a wall of said container to provide prongs for insertion into an electrical outlet, and an electrically conductive solid food product disposed within said container between and in surface contact with bottom of said electrodes, said food product having an electrical resistance obtained greater than the resistance of said electrodes. In an embodiment which is irrelevant to our invention, Furgal, et al discloses electrodes which include resilient and electrically conductive moisture retaining pads in surface contact with opposite ends of the food produced. At column 2, lines 43–54, in describing these moisture retaining pads, Furgal, et al states:

these pads are formed from a porous cellulose sponge material saturated with an electrolytic solution such as brine which renders the pads electrically conducting. Gelatin, alginate and other sponge-like substances may also be used to form the moisture-retaining pads. By reason of their resilient character, the electroyltic pads are capable of accommodating size differences and size changes in solid food products while at the same time insuring proper electrical contact therewith at all times during a food heating operation".

Examples set forth infra disclose the advantages of our invention over Furgal, et al. The fact that the gel-ionized species composition is an integral part of the surface of the food article in our invention rather than being a moisture retaining sponge pad, gives rise to an advantage which is unobvious and unexpected, that advantage being the crux of our invention.

Thixotropic emulsions containing non-ionic suspension agents and ionized species suspended therewith are known in the prior art but no compositions as defined herein are known. Thus, Canadian Pat. No. 734,862, issued on May 24, 1966 (Title: ELECTRICALLY CONDUCTIVE SYSTEMS) discloses a method for making an electrically conductive system for use in making electrocardiograms by providing an aqeuous solution of a non-ionic blend of ethylene oxide derivatives of lanolin, said derivatives being higher fatty alcohols; controlling the electrical conductivity therein by adding a highly ionizable salt; and adding a buffer solution to provide a pH of between substantially 4 to 8. Examples of highly ionizable salts are sodium chloride, potassium chloride and sodium sulfate which comprises from about 1 up to about 10% of the system.

SUMMARY OF THE INVENTION

The present invention provides a convenient, economically attractive solution to the above-mentioned problems. Basically, the high conducting food substance to which our invention is applied (I) is capable of being conveniently heated by means of the application of electrical energy thereto and (II) has:
 a. Substantially diametrically opposite ends;
 b. At least one substantially solid surface;

c. At least two electrical contacts located at said substantially diametrically opposite ends of said food substance and in contact with said substantially solid surface; and d. At least a substantial portion of said substantially solid surface having in intimate contact therewith, and as in integral portion thereof the composition of our invention consisting essentially of:
  i. A gel; and
  ii. A substantially ionized species said composition also being positioned to make intimate contact between the electrically high conducting food substance and the electrical contacts, whereby the contact is rendered non-arcing when an electromotive force is applied to said electrical contacts.

The composition of our invention which is to be in intimate non-arcing contact with both the solid surface of the food substance and at the same time with the electrical contacts, consists essentially of:
  i. An aqueous gel selected from the group consisting of agar, xanthan gum, tragacanth, guar gum, gum arabic and algin gum, in water; and
  ii. A substantially ionized species selected from the group consisting of sodium chloride, potassium chloride, ammonium chloride, magnesium chloride, sodium glutamate, potassium glutamate, sodium alginate, potassium alginate, ammonium alginate, magnesium alginate, calcium alginate, sodium bicarbonate, potassium bicarbonate, magnesium bicarbonate, and calcium bicarbonate.

Basically, the food package using the food substance having coated on it and having as an integral portion thereof the composition of our invention comprising:
  a. An electrically high conducting food substance having at least one substantially solid surface;
  b. At least two electrical contacts located at substantially diametrically opposite ends of said food substance; and
  c. The composition of our invention, as described above, consisting essentially of:
    i. An edible gel; and
    ii. An edible ionic species said composition being positioned to make intimate contact between the electrically high conducting food substance and the two electrical contacts, said composition being an integral portion of said solid surface.

The electrically high conducting foodstuff to which the composition of our invention is applied preferably has an electrical resistivity in the range of from 1 up to 50 ohm inches over a temperature range of from 30° F up to 250° F. Electrically high conducting foodstuffs having such physical properties are exemplified by the following:
  1. Ground meat patties;
  2. Sausage;
  3. Pizza topping;
  4. Kielbasa;
  5. Blintzes;
  6. Egg rolls;
  7. Cold cuts;
  8. Cold cuts-cheese combination, and
  9. Cold cut-chopped liver combination.

The electrically high conducting food substance to which the composition of our invention is applied preferably has coated thereon a composition wherein the weight ratio of gel to substantially ionized species is from about 1:20 up to about 20:1. The composition comprising the gel and the ionized species is an integral part of discrete portions of the substantially solid surface of the electrically high conducting food substance preferably in the proximate regions where the electrical conducting means contact the electrically high conducting food substance.

More specifically, the edible electrically high conducting composition of our invention is intended to form a continuous phase on gelling of setting (without completely drying out). The composition of the coating initially comprises:
  i. From 86 up to 99.3 weight percent water;
  ii. From 0.5% up to 4.0% by weight of the said edible gel; and
  iii. From 0.2% up to 10.0% by weight of the edible ionized species.

In addition, a packaged food product applicable to our invention comprises:
  a. An electrically low conducting food having high electrical resistivity;
  b. An electrically high conducting food disposed in proximate contact with said low conducting food;
  c. Said high conducting food having at least two substantially diametrically opposite high conducting food portions, having substantially solid external surfaces;
  d. In common intimate contact with at least two portions of at least one of the external surfaces of said high conducting food;
    1. An electrically high conducting composition comprising:
      i. A gel; and
      ii. An edible non-toxic ionic species;
    2. At least two electrical contacts said compositions being positioned to make intimate contact between the two electrical contacts and the substantially solid surface of said electrically high conducting food whereby the contact is rendered non-arcing when an electromotive force is applied to said electrical contacts;
  e. Enclosing said low conducting food, a hollow thermal insulating substantially moisture impervious container for holding said electrically low conducting food, said container being capable of existing in a closed position and in an open position, said container comprising two sections having substantially conterminous edges, a first section and a second section articulating said first section, said first section and said second section having mutually substantially continuous conterminous edges, at least one of said sections having an internal surface designed to fixedly hold said food over those portions of the external surfaces of said food which are in intimate non-arcing contact with said electrically high conducting composition and said electrical contacts when the container is in a closed position.

Preferred is such a packaged food product wherein:
  a. At least one of said container sections has substantially diametrically opposite internal surfaces which are conterminous with the external surfaces of said diametrically opposite high conducting food portions; and
  b. The electrical contacts extend outwardly from said container, said electrical contacts having electrically conducting ends external to said container, said ends being designed to make electrical contact with an electrical energy source when said container is in a closed position.

The above-mentioned packaged food product may be modified so that said first section of said container and said second section of said container have mutually substantially continuous co-extensive edges which edges are interrupted at the proximate regions of said substantially diametrically opposite high conducting food portions such that discrete container openings exist at said proximate regions whereby said electrical contacts have means of egress from said container when said container is in a closed position.

More particularly the enclosure part of the packaged food product of our invention consists of an electrically and thermally non-conducting shell, the internal ends of which are form-fitting to the protruding ends of the electrically conducting food substance. In addition, the said container, enclosure or shell may also be form-fitting to a minor part of the non-conducting food substance. A significant part of the form-fitting portion of the said shell may be lined with an electrical conducting means adhering thereto, such as a conducting film (e.g. by means of aluminum metallizing or foil) which preferably extends to the exterior of the shell or is attached to a second electrical conducting foil section or wire which extends to the exterior of the container at each end, or from its sides, so as to effect electrical contact with the electrodes of a cooking device without requiring the physical opening of the container or the physical penetration of the container during cooking. Metallizing can be effected according to any of the processes set forth in U.S. Pat. Nos. 3,533,828; 3,549,505; or 3,669,714.

A container, as described above for the purposes of our invention, is fabricated of an electrically and thermally insulating material such as cardboard, or preferably a rigid polymer, such as polyvinyl chloride or polyvinyl acetatepolyvinyl chloride copolymer, or an aerated polymer such as polystryrene of polyurenthane in order to provide a light, disposable package suitable for use in vending machines and for large scale food vending operations where it is desirable to cook rapidly large quantities of units and keep them reasonably warm for relatively long periods of time subsequent to cooking. Examples of such vending machines are set forth in U.S. Pat. No. 3,651,752 issued on Mar. 28, 1972. In particular, such a container, shell or enclosure would be operable whereby when an electrical current in the initial range of 1.0 to 10.0 amperes and from 100 up to 500 volts is applied for a period of time from 3 up to 20 seconds to an electrical conducting means, the food product within the container (e.g. a frankfurter having a diameter of ⅝–164 inch and being 4.5–6 inches in length) being cooked internally so that the average temperature of the electrically conducting food (such as a frankfurter) after cooking, is initially in the range from 140° F to 212° F and the average temperature range of the accompanying low conducting food (e.g. a frankfurter roll, hamburger bun or pizza dough) is, after cooking, initially in the range of 100° F to 160° F; and after about 50 minutes after cooking the average temperature of the high conducting food is in the range of from 100° F to 150° F and the average temperature of the low conducting food is from 90° F to 130° F. The container described herein accomplishes this, and in addition, obviates the need to expose fresh portions of the electrically conducting food (as, for example, by cutting or peeling the ends of a frankfurter) thereby (1) maintaining proper hygienic standards; (2) simplifying the packaging and (3) improving the accessibility of the food to the consumer.

The above described package, when used in conjunction with the composition of our invention coated onto the electrical contacts or the high conducting food substance or both, obviates the problem of undesirable arcing and consequent spot burning of the food thereby improving the desirability of the food from the consumer's standpoint and also improving the continuity of heat storage in the food substance.

When the container is fabricated from a yielding material such as, preferably styrofoam (aerated polystryene) or rigid polyvinyl chloride-polyvinyl acetate copolymer, the act of closing the container onto the food material in the initial packaging operation insures the necessary intimate contact between the internal surfaces of the substantially diametrically opposite ends of the container and the surface of the electrically conducting food substance (e.g. the frankfurter) at the ends thereof without danger of damage to the food. The rest of the container need not perform any function other than to (1) loosely enclose the food and (2) act as a thermal insulator subsequent to the cooking operation keeping the food in a conveniently warm state until it is eaten. The substantially diametrically opposite internal ends of the container may be lined with or may merely envelop electrically conducting means, preferably with an electrically conducting film such as a metallized aluminum surface or foil at least 0.2 mils in thickness ($2 \times 10^{-4}$ inches) which 1. Makes contact with the electrically high conducting food substances;
2. Extends or has an electrical connection from the ends, or the sides, to the outside of the container, shell or enclosure;
3. Is in contact with the composition of our invention comprising the gel and the ionized species which composition simultaneously is in contact with the electrically high conducting food substance; and
4. Makes contact during cooking with electrical contacts which are in turn in contact with an electrical energy source.

The electrical conducting means may be pinned or adhered to the internal end regions of the container in a form-fitting manner or may merely by enveloped by the container at the end regions thereof after the container is closed. In this manner a sufficiently large area of contact between the electrically conducting food and electrically conducting means is provided without the need for an operation which involves physical intrusion into the closed container at any time subsequent to packaging and prior to opening the package to eat the cooked food. This obviously insures sanitary handling and simplifies the construction of the cooking device. This sufficiently large area of contact is essential to the success of rapid and effective cooking. The ratio of the contacted surface area of high conducting food portion to non-contacted surface area of high conducting food portion is preferably from about 1:50 up to 1:4. The term "contacted" is intended to mean "area of electrically high conducting food contacted by the electrical conducting means." Too small a contact area (below the ratio of 1:50) can cause burning because it leads to arcing at voltages (and therefore currents) commensurate with conveniently rapid cooking while too high a contact area leads to slow cooking, including incomplete cooking at the extreme ends.

It must be emphasized that wherever the electrically high conducting food is contacted by the electrical conducting means and is present as an integral part of the high conducting food surface, the composition consisting essentially of the gel and the ionized species must also always be present. Thus, the ratio of coated surface area of high conduction food portion to non-coated surface area of high-conducting food portion (that is, coated with composition consisting essentially of gel and ionized species) is also preferably from about 1:50 up to 1:4 with the ratio of coated surface area of high conducting food portion to non-coated surface area of high conducting food portion always being greater than or equal to the ratio of contacted surface area of high conducting food portion to non-contacted surface area of high conducting food portion.

While a major use of the special package is for cooked frankfurter, other foods may be cooked with equal effectiveness in other packages using the same principles. These include: hamburgers, cheeseburgers, sausages other than frankfurters, pizza, kielbasa, blinzes, knishes, kishka, "egg rolls", cold cuts (e.g. corned beef, pastrami, and roast beef), cold cut-cheese combinations, and cold cut-chopped liver combinations.

While the electrical conducting means contacts a limited portion of the non-conducting food substance, i.e. frankfurter roll, or a hamburger bun or pizza dough, the roll becomes warm while the meat or pizza filling or the like is cooked more rapidly than otherwise, thus improving the palatability of the unit and permitting a longer period of time between cooking and consumption. Otherwise, heating of the non-conducting food is dependent upon heat conduction into it by means of the mass transfer of hot water vapor diffusing from the conducting food into the non-conducting food as the conducting food is heated. The operable and workable thickness range of the walls of the enclosure, shell or container used in conjunction with our invention is from 0.01 inches up to 1 inch with 3/32–¼ inches preferred in the case of a foamed polymer such as styrofoam and from 0.01 up to 0.1 inches preferred in the case of a rigid polymer such as a polyvinyl acetate-polyvinyl chloride copolymer, for ease in handling and for optimal thermal performance. The thermal conductivity of the materials of construction of the container, shell or enclosure should be less than 1.50 BTU/hour-sq.ft.-(° F/inch). A practical thermal conductivity range when using a foamed polymer is from 0.15 up to 0.50 BTU/hour-sq.ft.-(° F/inch). The more preferable range of thermal conductivity of the foamed polymer-type materials of construction of the shell, enclosure or container of our invention is from 0.20–0.30 BTU/-hour-sq.ft.-(° F/inch) at a mean temperature of between 60° F and 100° F. Thus, for example, a convenient and workable polystyrene foam for use as a material of construction may have at a mean temperature of 75° F the following thermal conductivity coefficients:

| Density | | K(BTU/hour-ft$^2$-(° F/inch) |
|---|---|---|
| 1 | lb/ft$^3$ | 0.26 |
| 1.5 | lb/ft$^3$ | 0.25 |
| 2 | lb/ft$^3$ | 0.24 |

A practical thermal conductivity range when using a thin wall (0.01–0.1 inch thickness) rigid polymer such as a polyvinyl chloride-polyvinyl acetate copolymer is from 1.0 up to 1.4 BTU/hour-sq.ft.-(° F/inch).

The container useful with our invention may be produced by means of vacuum forming or thermo-forming or by means of molding. Thus, for example, the thermo-formed container, shell or enclosure may be produced using rigid polymer or polymeric foam planar sheets of appropriate thickness wherein there is attached to said sheets metal foil strips in such a way that an excess of foil beyond the planar shape of the plastic is present, permitting the foil to follow the contours of the shaped plastic without tearing.

With the foregoing in mind, it is an object of the present invention to provide a composition which is conveniently coatable and capable of gelling or "setting up" on and in the interstices of the surface of a food substance which composition causes said food substance to be useable in conjunction with a packaged food product which is capable of being heated using electrial energy. It is another object of the present invention to provide a composition which is conveniently coatable on a food substance which composition causes said food substance to be use able in conjunction with an improved packaged food product for use in hot food dispensing machines, an integral part of which is a specially designed article of manufacture, whereby during and subsequent to electrical resistance cooking the packaged food may be conveniently maintained in a heated state until its consumption.

It is a further object of this invention to provide an edible composition which may be conveniently coated onto a food substance on discrete portions of the surface thereon in order to render said food substance useable in conjunction with an improved packaged food product containing an electrically high conducting food substance which can be heated and caused to remain in a heated state until consumption by means of electtrical resistance cooking without the occurence of undesired arcing and resultant spot burning during the cooking operation.

It is also an object of this invention to provide an edible composition consisting essentially of a gel and ionized species which composition may be conveniently coated onto a food substance at discrete portions of the surface thereon in order to render said food substance useable in conjunction with a packaged food product in which the food substance which is an electrically high conducting food substance is disposed in intimate non-arcing contact with an electrically low conducting food with the high conducting food having two substantially diametrically opposite high conducting food portions of substantially solid surfaces, substantially opposite regions of which are coated with the composition of our invention consisting essentially of a gel and an ionized species whereat an electrical current can be easily conducted into and out of the electrically high conducting food substance and which high and low conducting foods are contained in an enclosure or shell or container for enclosing the food during and subsequent to the electrical resistance cooking of same which is designed to:

1. Be thermally and electrically insulating;
2. Totally envelop the electrically low conducting food;
3. Have an internal surface fixedly holding the food over a significant portion of the surface of the food;

4. Have internal substantially diametrically opposite surfaces which are co-extensive with the external surfaces of diametrically opposite food ends; and
5. Have within the container, in intimate contact with the substantially diametrically opposite ends of the high conducting food (which have coated thereon or are in intimate contact with the composition comprising the gel and ionized species) electrical conducting means (such as aluminum metallizing aluminum foil) which extend outwardly from the container or shell or enclosure when it is in a closed position, which electrical conducting means are designed to make electrical contact with a source of electrical energy.

It is a further object of this invention to provide an edible electrically high conducting composition (which forms a continuous solid phase on dry out) which may be conveniently coated onto a solid food substance at discrete portions of the surface thereon in order to render said electrically high food substance adaptable for use in a container or shell or enclosure designed for enveloping an electrically low conducting food which is in contact with electrically high conducting food coated at its end regions with a composition comprising a gel and an ionized species which container or shell or enclosure is so designed that it is both thermally and electrically insulating and the container or enclosure or shell includes, as integral parts thereof, at least two separate electrical conducting means substantially at the ends thereof passing from the outside of the container or shell or enclosure, each of which means is caused by the container or enclosure or shell itself to be in intimate non-arcing contact with the substantially diametrically opposite ends of the electrically conducting food (at the portions coated with the above-mentioned composition) intended to be cooked during the electrical resistance cooking operation.

It is a further object of our invention to provide an edible electrically high conducting composition which forms a continuous solid phase on dry out consisting essentially of a gel and an ionized species, which composition may be conveniently coated onto discrete portions of the surface of a solid electrically high conducting food substance in order to render said electrically high conducting food substance adaptable to be used in conjunction with a packaged food product (including the electrically conducted food substance in contact with an electrically non-conducting food substance) which food substance is enveloped in an enclosure, shell or container specifically designed for maximum convenience in catering by (i) facilitating the passage without undesirable electrical arcing of an electrical current through the electrically conducting food substance for electrical resistance cooking of same, and (ii) simultaneously causing same to remain in a heated state for an extended period of time subsequent to the passage of said electrical current without exposing the said food substance to possible sources of contamination These and other objects of the invention will become apparent upon a consideration of the detailed description of preferred embodiments thereof given in connection with the following drawings.

DETAILED DESCRIPTION OF THE DRAWINGS

FIG. 1 is a longitudinal cross-sectional view showing an electrically low conducting food 106 enveloping an electrically high conducting food (a frankfurter) 109 (which has part of its surface, which is in contact with the electrical contacts 134, coated with the composition of our invention, 195, consisting essentially of a gel and an ionic species at regions 111 and 111') enclosed within the container, shell or enclosure 101' and 101" (which container, shell or enclosure is in a closed position). The electrically high conducting food is shown being cooked using the electrical contacts 134 (e.g., consisting of aluminum foil strips) which extend outwardly from the container or shell or enclosure at 141 and 141' and which are in electrical contact with the terminals 122 of an electrical energy source (not shown). Composition 195 is in common contact with contacts 134 and frankfurter 109. Composition 195 is an integral part of the surface of frankfurter 109.

FIG. 2 is a close-up longitudinal cross-sectional view of an end portion of the electrically low conducting food 106 enveloping an end portion of the electrically high conducting food 127 (a frankfurter) (which is coated with the composition of our invention, 195 consisting essentially of a gel and an ionized species such as sodium chloride on that portion of its surface which is in contact with an electrical contact 134) enclosed within the container, shell or enclosure (which container, shell or enclosure is in a closed position). The electrically high conducting food is shown being cooked using the electrical contacts 134 (e.g., aluminum foil strips) which extend outwardly from the container or shell or enclosure and which are attached to the terminals (not shown) of an electrical energy source (also not shown). Composition 195 is in common contact with contacts 134 and frankfurter 109. Composition 195 is an integral part of the surface of frankfurter 109.

FIG. 3 is a longitudinal cross-sectional view of the packaged food product which our invention is applicable wherein the electrically low conducting food 112 has only one of its surfaces 116 in intimate electrical contact with the electrically high conducting food 108 (as is the case when cooking pizza or an open face roast beef sandwich or an open face hamburger or cheeseburger) and wherein the electrical contacts 135 (such as aluminum metallizing or aluminum foil) adhering to the internal surfaces of the substantially diametrically opposite ends of the container or shell or enclosure 150 are caused as a result of the container or shell or enclosure design to be in intimate non-arcing contact with the end portions of the electrically high conducting food surfaces. The electrical contacts 135 are in contact with an electrical energy source during the cooking operation through leads 123. In common contact with the ends of the electrically high conducting food (and as an integral part of the surface of the high conducting food) and the electrical contact is the composition of our invention, 196, consisting essentially of a gel (such as agar) and an ionized species (such as sodium chloride) the presence of which composition prevents arcing during the electrically resistance cooking operation.

FIG. 4 is a front perspective view of a packaged food product (adapted for using the food substance onto which is coated the composition of our invention) with an enclosure 117 therefor in an open position wherein the enclosure is holding an electrically low conducting food 106 (in this case the lower portion of the hot dog bun) which is enveloping an electrically high conducting food 109 (in this case a hot dog having a length which is less than the length of the electrically low conducting food). The electrically high conducting food 109 is being cooked using electrical contacts 136 and 136' (e.g., aluminum foil strips) which extend outwardly from the side of the container or shell or enclosure at 147 and 147' and which are attached to the terminals of an electrical energy source (not shown). The electrical contacts are affixed to the surface 211 and 211' of the electrically high conducting food at those regions of the surface of said high conducting food which are coated with the composition of our invention, 195 and 195', consisting essentially of a gel (such as agar) and an ionized species (such as sodium chloride) in order to eliminate arcing during the electrical resistance cooking operation. Composition 195 and 195' are integral parts of surface 211 and 211' of hot dog 109.

FIG. 5 is a cross-sectional view taken along the line 5—5 of FIG. 4. The surface of the electrically high conducting food (in this case a hot dog) is coated with the composition of our invention, 195, consisting essentially of a gel and an ionized species at that section 211 which is in common contact with the electrical contact. Composition 195 is an integral part of the surface of hot dog 109.

FIG. 6 is a front perspective view of a packaged food product (adapted for using the food substance onto which is coated the composition of our invention) with the enclosure therefor in an open position wherein the enclosure 217' is holding an electrically low conducting food 179 and 179' (in this case, a hamburger bun) which is enveloping an electrically high conducting food 178 (in this case, a hamburger).

FIG. 7 is a front perspective view showing a packaged food product (adapted for using the food substance onto which is coated the composition of our invention) consisting of the electrically low conducting food (such as a hamburger bun) enveloping the electrically high conducting food (such as a hamburger) totally enclosed within a hollow thermally and electrically insulating container 301' and 301'' with electrical contacts 236 and 236' protruding therefrom at 247 and 247' (which electrical contacts are caused by the design of the container or shell or enclosure to be in intimate non-arcing contact with the hamburger). The electrical contacts 236 and 236' and the surface of the hamburger in contact with the electrical contacts have therebetween the composition of our invention at 199 of FIG. 8 consisting essentially of a gel such as agar and an ionized species such as salt. The electrical contacts 236 and 236' are connected to a source of electrical energy during the cooking operation (not shown). Composition 199 is an integral part of the surface of the electrically high conducting food.

FIG. 8 is an enlarged cross-sectional view taken along line 8—8 of FIG. 7 showing a portion of the electrically low conducting food 179 and 179' enveloping the electrically high conducting food 178 (in this case, a hamburger) enclosed within a container 301' and 301'', shell or enclosure (which container, shell or enclosure is in a closed position). The electrically high conducting food is shown being cooked using the electrical contacts 236 (e.g., aluminum foil) which extend outwardly from the container, or shell or enclosure at 247 and which are attached to the terminals of an electrical energy source (not shown). In common contact with the electrically high conducting food 178 (in this case, a hamburger) and the electrical contacts 236 is the composition of our invention, 199, consisting essentially of a gel such as agar and an ionized species such as sodium chloride. In this case, the composition of the gel and an ionized species is coated onto and absorbed into the interstices of the surface of the hamburger. It is to be emphasized however, that the composition of the gel and ionized species is coated in two discrete portions in a non-continuous manner only in the regions of electrical contacts 236.

DESCRIPTION OF THE PREFERRED EMBODIMENT

Figure 1:
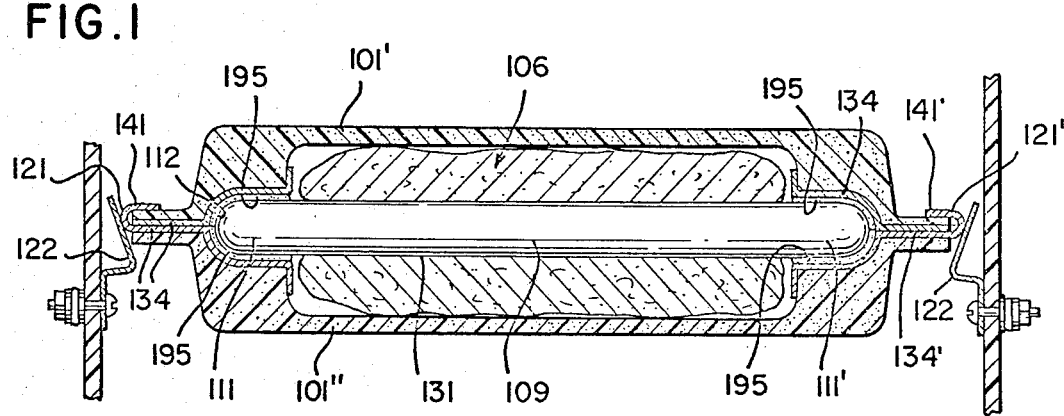

The utilization of the composition of our invention which consists essentially of an ionized species such as sodium chloride, potassium chloride, ammonium chloride, magnesium chloride, sodium glutamate, potassium glutamate, sodium alginate, potassium alginate, ammonium alginate, magnesium alginate, calcium alginate, sodium bicarbonate, potassium bicarbonate, magnesium bicarbonate and calcium bicarbonate, and a gel such as agar, xanthan gum, tragacanth, guar gum, gum arabic and algin gum as well as water wherein:

i. The weight of water is initially 86 up to 99.3 weight percent;

ii. The weight percent of gel is initially 0.5% up to 4.0% by weight; and iii. The weight percent of edible ionized species is initially from 0.2% up to 10.0% by weight is illustrated at locations 195, 196 and 199 in FIGS. 1, 2, 3, 4, 5, 8, 9 and 10. The composition may be coated onto an electrically high conducting food substance where the electrical contacts 134, 135, 136 or 236 are to contact the electrically high conducting food substance 108, (pizza topping), 109 (frankfurter) and 178 (hamburger). Alternatively, the composition of our invention may be coated both onto the electrical contact and onto the electrically high conducting food substance where the electrical contact is in intimate non-arcing contact with the electrically high conducting food substance, whereby the contact is rendered non-arcing when an electromotive force is applied to said electrical contacts.

Figure 7:
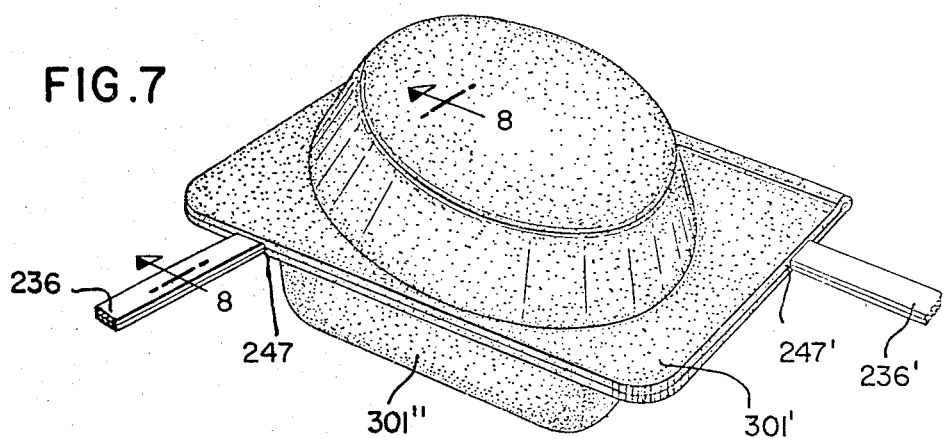
Figure 8:
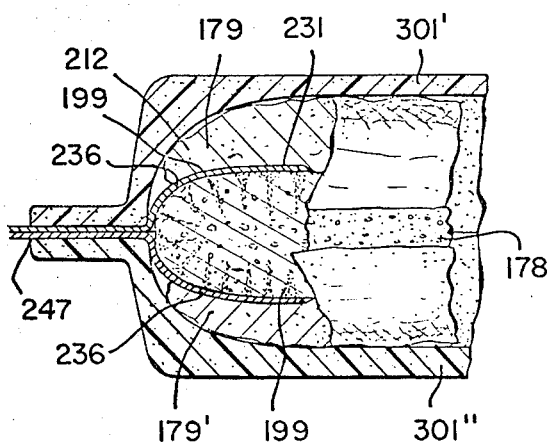
Figure 9:
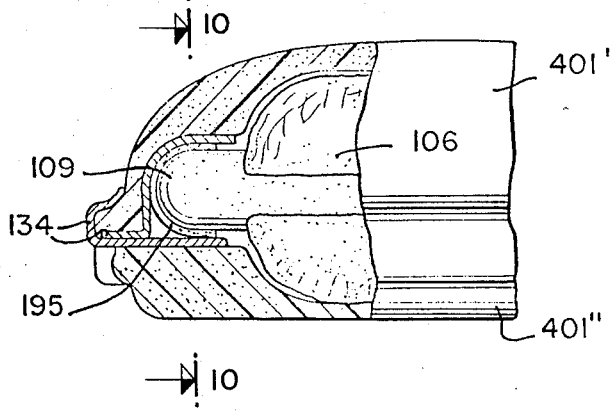
FIG. 9 is a side view of a partially cut-away packaged food product adapted for using the food substance onto which is coated the composition of our invention wherein the container, shell or enclosure thereof is produced by thermoforming.
Figure 10:
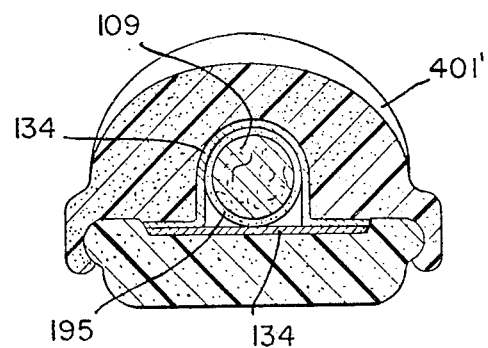
FIG. 10 is a cross-sectional view taken along line 10—10 of FIG. 9.

The containerized food product adapted for using the food substance coated with the composition of our invention is specifically illustrated in the drawings as comprising, firstly, an electrically low conducting food substance such as a frankfurter bun 106 or pizza dough 114 or a hamburger bun 179; and an electrically high conducting food substance such as a frankfurter 109 disposed in proximate contact at 131 (as shown in FIG. 1) with the low conducting food substance, or such as a hamburger 178 disposed in proximate contact at 231 (as shown in FIG. 8) with the hamburger bun said high conducting food having an electrical resistivity of from 1 up to 50 ohm inches over a temperature range of from 30° F up to 250° F and having substantially diametrically opposite ends, e.g., in the case of the hamburger 211 and 211', in the case of the pizza topping 150 and 150' and in the case of the frankfurter 111 and 111'. The substantially diametrically opposite ends have substantially solid surfaces 112 and 112' in the case of the frankfurter and 212 in the case of the hamburger. At least two electrical contacts 134 and 134' (in the case of the frankfurter) and 236 and 236' (in the case of the hamburger) are located at the substantially diametrically opposite ends of the electrically high conducting food substance in intimate contact with the electrically high conducting food substance such that an electrical current can easily pass from the contact to the electrically high conducting food substance without undergoing a high voltage drop and without causing an electrical "arc" to be product between said electrical contact end the surface of the food substance. The composition, as stated above, comprising an edible gel and an edible ionic species is positioned, e.g., at 195 in the case of the frankfurter of at 199 in the case of the hamburger to make intimate non-arcing contact between the electrically high conducting food substance, e.g., 178 in the case of the hamburger and the two electrical contacts, e.g., 236 and 236' in the case of the hamburger. The electrical contacts extend outwardly beyond the low conducting food e.g., at 247 and 247' in FIG. 7.

Figure 3:
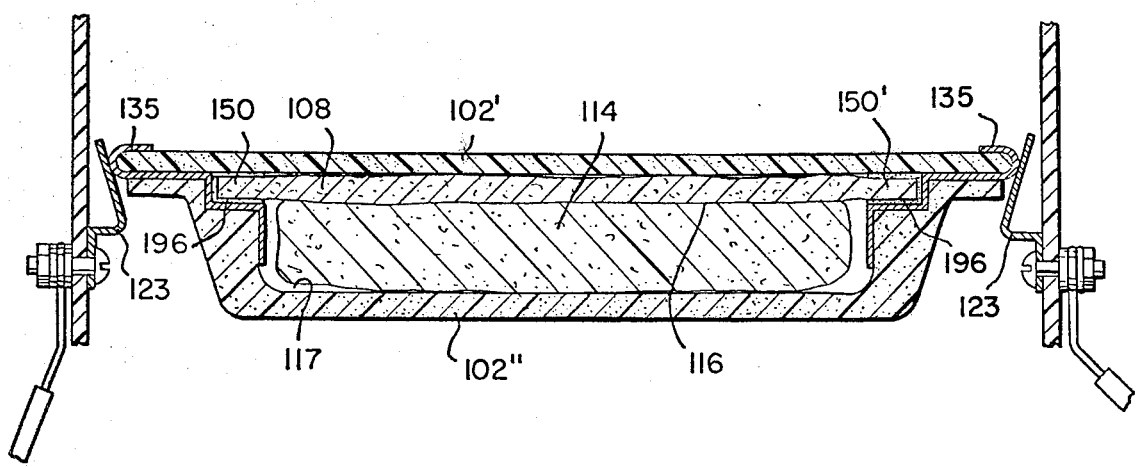
Figure 4:
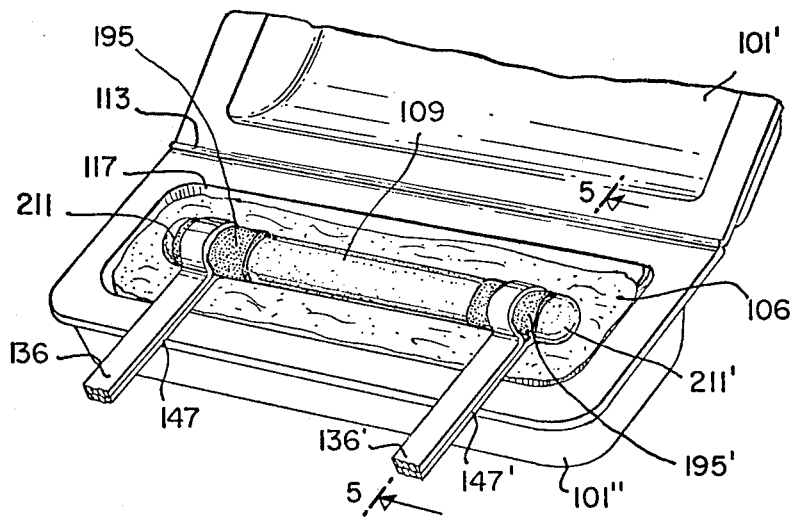
Figure 5:
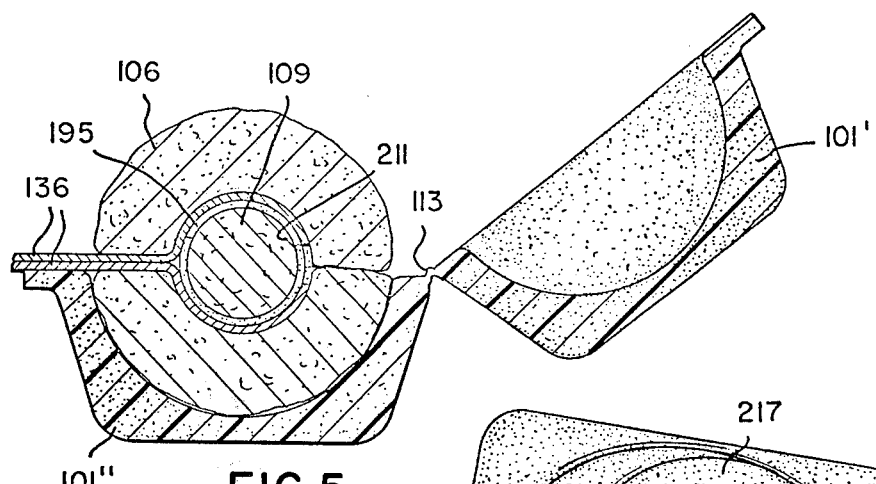
Figure 6:
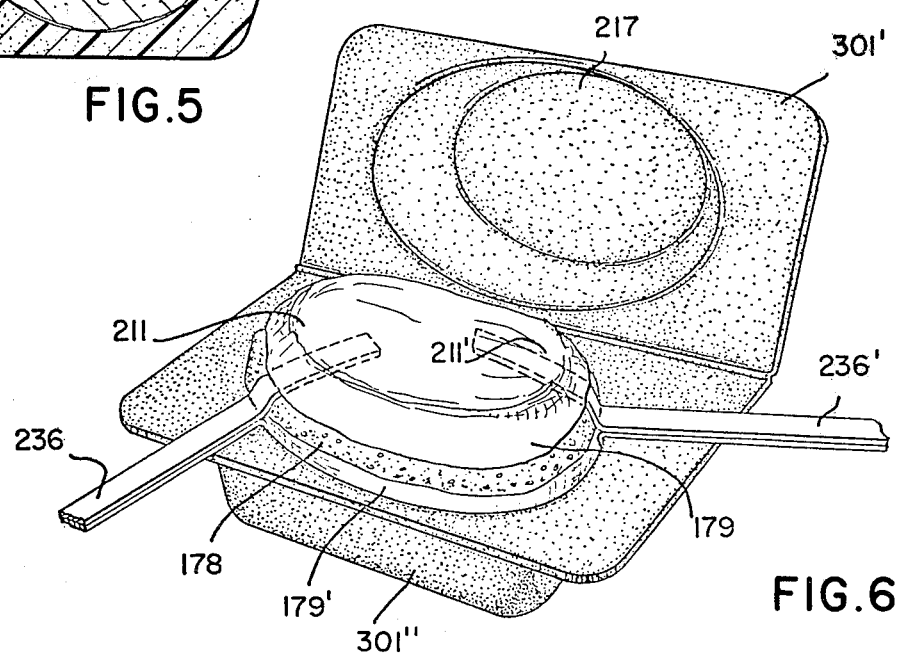

Enclosing the electrically low conducting food is a hollow thermally and electrically insulating substantially moisture impervious enclosure or shell or container e.g., 101' and 101" or 301' and 301" fabricated from, for example, styrofoam having a thickness of from 3/32 inch up to 1 inch and a thermal conductivity range over a mean temperature of from 60° F to 100° F of from 0.2 up to 0.3 BTU/hour-sq. ft. - (° F/inch) the enclosure or shell or container being capable of existing in a closed position shown in FIG. 7 and in an open position shown in FIGS. 4 and 6. The outer surfaces 301a FIG. 7 of the container are so designed as to render said container conveniently adaptable for use in conjunction with an electrical resistance cooking apparatus such as an automatic vending machine as described in U.S. Pat. Nos. 3,548,738 and 3,651,752. The said container 101 or 301 or shell or enclosure is constructed of two sections 101' or 301' and 101" or 301" having substantially conterminous edges with section 101' articulating section 101" or 301' articulating section 301". In fact, section 101' may be so designed as to be hinged at 113 with section 101" and/or may interlock at 114 (see FIG. 4) with section 101". At least one of sections 101' or 101" has an internal surface 117 designed to fixedly hold the electrically low conducting food substance at least at the substantially diametrically opposite ends of the food substance when the container is in a closed position shown by FIG. 7. At least one of the container sections 101' or 101" has substantially diametrically opposite ends which has internal surfaces which are co-extensive with the external surfaces of the substantially diametrically opposite ends of the high conducting food portions 111 and 111'. Electrical conducting means such as strips of aluminum foil having a thickness of approximately 0.2 ml, 134 and 134', extend outwardly from the container 101 at 130 and 130' (the ends of the container) or can extends outwardly from container 101 from the sides of the container at 147 or 147' (see FIG. 4) or from the corners of the container (in the case of the hamburger shown in FIGS. 6, 7 and 8) at 247 and 247'. The electrical conducting means have electrical conducting ends 121 and 121' shown in FIGS. 1 and 3 external to the container or enclosure which ends are designed to make electrical contact with the terminals 122 and 122' of the electrical energy source when the container is in a closed position.

Figure 2:
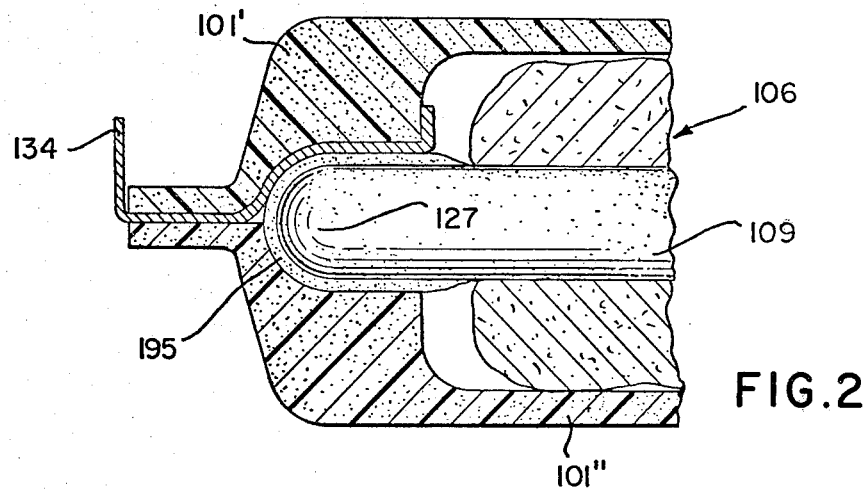

In common intimate contact with at least two discrete (or discontinuous) portions (having a substantial degree of separation therebetween) of at least one of the external surfaces of the high conducting food are:
1. An electrically high conducting composition consisting essentially of a gel and an edible ionic species as illustrated in FIG. 2 at 127 and in FIG. 5 at 109 and in FIG. 8 at 212; and
2. At least two electrical contacts shown as 134 in FIG. 1 and as 136 in FIG. 5, the composition being positioned to make intimate contact between the two electrical contacts and the substantially solid surface of the electrically high conducting food substance at, for example (127) of FIG. 2 whereby the contact is rendered non-arcing when an electromotive force is applied to said electrical contacts.

When ready for use in conjunction with an electrical resistance cooking apparatus, the portions of the electrical conducting means such as the aluminum foil external to the walls of the container or shell or enclosure are preferably bent back substantially adjacent to the surfaces of the container or shell or enclosure walls at 141 and 141', thus enabling effective low-resistance electrical contact to be maintained between the terminals 122 and 122' and the ends 121 and 121'. The presence of the composition of our invention, 195, consisting essentially of the gel and the ionized species prevents arcing when the low resistance electrical contact is maintained between the terminals and the ends 121 and 121'. Portions of the electrical conducting means, 134 and 134' which are on the internal surfaces of the substantially diametrically opposite high conducting food portions 111 and 111' and which are in contact with the internal surfaces of the diametrically opposite ends of the container or shell or enclosure may be coated with the composition of our invention consisting essentially of the gel and the ionized species at 195. By the same token, portions of the electrical conducting means 134 and 134' which are on the internal surfaces of the diametrically opposite ends of the container or shell or enclosure will be in intimate electrical contact with the external surfaces 112 and 112' of the two diametrically opposite high conducting food portions 111 and 111' when the container is in a closed position as illustrated in FIG. 7 whereby the contact is rendered non-arcing when an electromotive force is applied to said electrical contacts.

The electrically high conducting food substance such as a frankfurter or hamburger may be disposed substantially within the low conducting food substance as illustrated in FIGS. 1, 4 and 6. Alternatively, the electrically high conducting food substance may be disposed in contact with but one surface of the low conducting food as in the case of a pizza slice as illustrated in FIG. 3.

The edges of the enclosure or shell or container are substantially conterminous and may be interrupted at 147 and 147' or at 247 and 247' at the proximate regions 111 and 111' or 211 and 211' of the substantially diametrically opposite high conducting food portions, such that discrete minute container openings exist at these proximate regions. The preferred ration of the surface area of the contacted high conducting food substance (that is, contacted with an electrical contact) to the surface area of non-contacted high conducting food substance is from 1:50 up to 1:4 with the most preferred ratio being from 1:15 up to 1:4. The ratio of surface area of coated high conducting food substance (that is, coated with composition consisting essentially of the gel and the ionized species) to the surface area of non-coated high conducting food substance is at least as great as the ratio of the surface area of contacted high conducting food substance (that is, contacted with an electrical contact) to the surface area of non-contacted high conducting food substance. Thus, the preferred ratio of surface area of coated high conducting food substance to non-coated high conducting food substance is also in the range of from 1:50 up to 1:4 with the most preferred ratio being from 1:15 up to 1:4. The electrically high conducting food, 109 in the case of the frankfurter, may also be thermally high conducting.

The following Examples A–J serve to illustrate a product taught by Furgal, et al U.S. Pat. No. 3,062,663. The food products of our invention are compared in subsequent Examples with the Furgal, et al products.

EXAMPLES A–J

A food package containing one frankfurter illustrated in FIG. 11 is constructed. This package is designed in a manner similar to that of Furgal, et al. U.S. Pat. No. 3,062,663 issued on Nov. 6, 1962. This package is different from the actual Furgal, et al FIG. 2 which is illustrated herein as FIG. 12. Foam Section 23 was fabricated by slicing a 1½ × ½ inch × 10 inch section of "Thrifty Miss Wax Applier and Polisher" distributed by Thrifty Miss Products of Linden, N.J. 07036 and placing two foam strips whereat reference numeral 23 is set forth in each of the drawings above. Then the following experiments yielding the following results were performed:

EXPERIMENT A

The 1½ inch × ½ inch × 10 inch strips of foam were soaked in a 5% solution of sodium chloride and then "squeegeed" removing a substantial quantity of fluid and immediately placed in the food package as set forth in the Furgal design. A frankfurter (Schnickhaus, manufactured by the Van Wagenen & Schickhaus Company, a Division of Swift & Company, Kearny, New Jersey 07032) (⅝ oz. wt.) was placed at a position indicated by reference numeral 230 in the above drawings. Electrodes indicated by reference numeral 19 were then connected to a source of electrical power of approximately 320 volts. No cooking of the frankfurter occurred.

EXPERIMENT B

An experiment similar to Experiment A was carried out with the exception instead of the 5% sodium chloride solution, a saturated sodium chloride solution was used and the sponge was not squeezed dry but was allowed to remain drenched with the saturated salt solution. When the voltage of approximately 320 volts was applied, the hot dog was cooked to an acceptable and edible extent in 15 seconds.

EXPERIMENT C

An experiment similar to Experiment A was carried out with the exception that the sponges indicated by reference numeral 23 in the above drawings were dipped in a 5% sodium chloride solution and permitted to remain drenched with the 5% sodium chloride solution. Application of 280 volts gave rise to arcing at 20 seconds and the buckling of the frankfurter without cooking it.

EXPERIMENT D

An experiment similar to Experiment C was carried out with the exception that a voltage of 110 volts are applied to electrode strips 19. The frankfurter was cooked to an edible extent in 90 seconds.

EXPERIMENT E

An experiment similar to Experiment D was carried out with the exception that the sponges indicated by reference numeral 23 in the drawings were squeegeed thereby effecting the removal therefrom of a substantial quantity of fluid prior to application of the voltage of 110 volts. With application of 110 volts, the frankfurter was still cold and uncooked at 2 minutes. Cooking started at 2½ minutes and the frankfurter was just warm at 3½ minutes. The sponges started burning, giving an "off taste" and an "off odor" to the frankfurter and the surrounding environment. In addition, a hole was burned in the electrolyte-carrying sponge.

EXPERIMENT F

An experiment similar to Experiment E was carried out with the exception that the voltage applied at strips indicated by reference numeral 19 in the above drawings was 320 volts. After 25 seconds arcing occurred at one side of the hot dog and the hot dog remained cold and uncooked with no electrical current passing therethrough.

EXPERIMENT G

An experiment similar to Experiment B was carried out with the exception that the voltage applied at strips indicated by reference numeral 19 was 110 volts. Although the frankfurter appeared to be barely warm at 1 1/4 minutes it was cold at 5 minutes with no cooking taking place.

EXPERIMENT H

An experiment similar to Experiment G was carried out with the exception that a voltage of 320 volts was applied at strips indicated by reference numeral 19. Arcing and burning occurred after 15 seconds with the current rising to 2–3 amperes after 15 seconds; but the frankfurter was well cooked. The experiment was repeated and no cooking occurred. The experiment was repeated again and severe arcing occurred without cooking.

EXPERIMENT J

An experiment similar to Experiment G was carried out with the exception that after 5 minutes of no cooking a 0.5 cc portion of saturated sodium chloride solution was placed in each sponge at a place immediately adjacent to the frankfurter which we were attempting to cook. Immediately on placing the sodium chloride solution in the sponge adjacent to the frankfurter with strips 19 connected to the 110 volt source of electrical power, cooking occurred for an instant, but this ceased immediately and the frankfurter remained essentially uncooked.

The following Examples serve to further illustrate additional embodiments of our invention concerning the composition of the gel and ionized species as it is now preferred to practice it. It will be understood that these Examples are illustrative and that our invention is to be considered restricted thereto only as indicated in the appended claims.

EXAMPLE I

A 6 inch by three-quarter inch beef frankfurter is coated at each end to the extent of one inch with a warm aqueous solution of 2% agar and 4% sodium chloride. After setting of the gel by cooling, the frankfurter is placed in a bun and the combination frankfurter and bun is placed in a container having electrical contacts attached thereto and connected to a source of electrical energy as illustrated in FIG. 4. Over a period of 18 seconds, a primary voltage of 115 volts stepped up to 340 volts is applied to the electrical contacts from the electrical energy source which results in a flow of 1.2 up to 3.4 amperes. (To achieve equivalent results, a primary voltage of 110, 220 or 440 volts may be transformed to an applied voltage in the range of 300–400 volts.) The frankfurter roll and frankfurter resulting from the aforementioned treatment is described as "very hot, steaming and slightly split". No arcing took place during the heating operation.

EXAMPLES II–XXIX

The same procedure as Example I is followed in the following examples set forth in the following table. Varied are the gel ionized species composition and the electrical energy contact time and voltage.

| Example | Gel-Ionized Species Combination | Description of Electrical Energy | Result of Electrical Resistance Cooking |
|---|---|---|---|
| II | 2% agar & 5% sodium chloride | Primary voltage of 115 volts stepped up to 335 volts, applied over a period of 12 seconds/1.5–3.2 amperes. | Very hot, steaming. |
| III | 2% agar & 5% sodium chloride | Primary voltage of 115 volts stepped up to 340 volts, applied over a period of 8 seconds/1.4–3.2 amperes. | Hot, not steaming. |
| IV | 2% agar & 5% sodium chloride | Primary voltage of 115 volts stepped up to 345 volts, applied over a period of 10 seconds/1.4–3.2 amperes. | Hot, just starting to steam. |
| V | 2% agar % 5% sodium chloride Agar allowed to set on frankfurter before cooking. | Primary voltage of 115 volts stepped up to 345 volts, applied over a period of 10 seconds/1.4–3.2 amperes. | Hot, steaming. |
| VI | 4% gelatin & 5% sodium chloride | Primary voltge of 115 volts stepped up to 335 volts, applied over a period of 10 seconds/0.8–2.5 amperes. | Frankfurter just warm; arced at end (9 seconds). |
| VII | 4% gelatin & 5% sodium chloride | Primary voltage of 115 volts stepped up to 335 volts, applied over a period of 10 seconds/0.8–2.2 amperes. | Frankfurter just warm; arced at 7 seconds. |
| VIII | 4% gelatin & 5% sodium chloride (Gelatin allowed to dry on hot dog) | Primary voltage of 115 volts stepped up to 340 volts, applied over a period of 10 seconds/0.8–1.2 amperes. | Slight warming; arced at 5 seconds. |
| IX | Gelatin 8% & sodium chloride 5% | Primary voltage of 115 volts stepped up to 345 volts, applied for a period of 10 seconds/1.0–2.6 amperes | Frankfurter just warm; arcing at 9 seconds. |
| X | Gelatin 8% & sodium chloride 5% | Primary voltage of 115 volts stepped up to 350 volts, applied for a period of 10 seconds/1.2–2.8 amperes. | Cooked, hot frankfurter, no arcing. |
| XI | Gelatin 8% & sodium chloride 5% | Primary voltage of 115 volts stepped up to 335 volts, applied for a period of 10 seconds/1.0–2.6 amperes. | Frankfurter cooked and hot, no arcing. |
| XII | 2% agar & ½% | Primary voltage of | No cooking |

-continued

| Example | Gel-Ionized Species Combination | Description of Electrical Energy | Result of Electrical Resistance Cooking |
|---|---|---|---|
| | graphite | 115 volts stepped up to 335 volts, applied for a period of 10 seconds/1.20 amperes. | (arced at 3 seconds). |
| XIII | Agar 2% & ½% graphite | Primary voltage of 115 volts stepped up to 340 volts, applied for a period of 10 seconds/0.8-2.2 amperes. | Frankfurter slightly warmed but arced at 7 seconds. |
| XIV | Gelatin 12% & sodium chloride 5% | Primary voltage of 115 volts stepped up to 355 volts, applied for a period of 10 seconds/1.2-2.2 amperes. | Frankfurter hot but arced just at the end of the 10-second period. |
| XV | Gelatin 12% & Sodium Chloride 5% | Primary voltage of 115 volts stepped up to 350 volts, applied over a period of 10 seconds/1.2-2.4 amperes. | Frankfurter just warm, arced at 7 ½ seconds. |
| XVI | 2% agar, ½% sodium chloride & ½% graphite | Primary voltage of 115 volts stepped up to 335 volts, applied over a period of 10 seconds/1-2.8 amperes. | Frankfurter hot but arced just at the end of the 10-second period. |
| XVII | Agar 2%, sodium chloride ½%, graphite ½% | Primary voltage of 115 volts stepped up to 340 volts, applied over a period of 10 seconds/1.0-3.1 amperes. | Frankfurter hot and cooked and no arcing took place. |
| XVIII | Gelatin 12%, Sodium Chloride 7½% | Primary voltage of 115 volts stepped up to 340 volts, applied over a period of 10 seconds/1.2-2.3 amperes. | Frankfurter warmed but arcing at 6 seconds. |
| XIX | Agar 2% and sodium chloride 5% | Primary voltage of 115 volts stepped up to 345 volts, applied over a period of 10 seconds, 1.4-3.2 amperes. | Frankfurter very hot and steaming. |
| XX | Agar 2%, sodium chloride 5% | Primary voltage of 115 volts stepped up to 345 volts applied over a period of 12 seconds/1.4-3.4 amperes. | Frankfurter very hot and shrivelled. |
| XXI | Agar 2%, sodium chloride 5% | Primary voltage of 115 volts stepped up to 340 volts, applied over a period of 12 seconds/1.4-2.8 amperes. (Configuration according to FIG. 2 rather than FIG. 14) | Frankfurter hot and cooked. |
| XXII (Control) | Sodium Chloride 5% | Primary voltage of 115 volts stepped up to 355 volts, applied over a period of 12 seconds/1.4-2.7 amperes. (Aluminum foil in container according to FIG. 2) | Arcing at 3 seconds; no cooking. |
| XXIII | Gelatin 2%, sodium chloride 5% | Primary voltage of 115 volts stepped up to 350 volts, applied over a period of 12 seconds/1.2-2.2 | Frankfurter just warm; arcing at 9 seconds. |

-continued

| Example | Gel-Ionized Species Combination | Description of Electrical Energy | Result of Electrical Resistance Cooking |
|---|---|---|---|
| XXIV | Agar 2%, sodium chloride 5% | amperes. (Aluminum foil in container according to FIG. 2) Primary voltage of 115 volts stepped up to 355 volts, applied over a period of 10 seconds/1.8–3.3 amperes. (Configuration according to FIG. 2 except 4 aluminum strips 2 in each cavity). | Frankfurter extremely hot. |
| XXV | 2% agar, 5% sodium chloride | Primary voltage of 115 volts stepped up to 355 volts, applied over a period of 10 seconds/1.7–3.1 amperes. (Configuration according to FIG. 2 except 4 aluminum strips 2 in each cavity). | Frankfurter very hot. |
| XXVI (Control) | 5% Sodium Chloride | Primary voltage of 115 volts stepped up to 340 volts, applied over a period of 10 seconds/1.2–2.1 amperes. (Configuration according to FIG. 2) | Arcing at 4 seconds. |
| XXVII | Agar 2%, sodium chloride 5% | Primary voltage of 115 volts stepped up to 345 volts, applied over a period of 10 seconds/1.8–3.4 amperes. (Configuration according to FIG. 14) | Frankfurter very hot. |
| XXVIII | 2% Agar, 5% sodium chloride | Primary voltage of 115 volts stepped up to 345 volts, applied over a period of 8 seconds/1.6–3.1 amperes. (Configuration as in FIG. 14). | Frankfurter hot. |
| XXIX (Control) | 2% Sodium Chloride | Primary voltage of 115 volts stepped up to 350 volts, applied over a period of 8 seconds/0.6–2.8 amperes. (Configuration as in FIG. 14). | Arcing at 8 seconds, no cooking. |

EXAMPLES XXX - LVI

A 6 inch by three-quarter inch all beef frankfurter is coated similarly to Example I and is placed in a frankfurter roll which extends beyond the diametrically opposite ends of said frankfurter. The frankfurter in the roll is placed in a container desinged as in FIGS. 22, 23, 24 or FIGS. 27 and 28. The container is produced from thermoformed polyvinyl chloride. The following table sets forth the electrical energy variables as well as the gel-ionized species composition variables upon which the efficiency of cooking of the packaged food product of our invention is dependent:

| Example | Gel-Ionized Species Combination | Description of Electrical Energy | Result of Electrical Resistance Cooking |
|---|---|---|---|
| XXX | 5% sodium chloride, 2 ½% gum tragacanth | Primary voltage of 115 volts stepped up to 340 volts, applied over a period of 10 seconds/1.2–3.1 | Frankfurter very hot. |

-continued

| Example | Gel-Ionized Species Combination | Description of Electrical Energy | Result of Electrical Resistance Cooking |
|---|---|---|---|
| XXXI | 5% sodium chloride, 2 ½% gum tragacanth | Primary voltage of 115 volts stepped up to 345 volts, applied over a period of 10 seconds/1.2–3.3 amperes. | Frankfurter very hot. |
| XXXII | 5% sodium chloride; 2 ½% gum tragacanth (solution allowed to "set" on frankfurter) | Primary voltage of 115 volts stepped up to 360 volts, applied over a period of 10 seconds/1.8–4.0 amperes. | Frankfurter very, very hot. |
| XXXIII | 5% sodium bicarbonate; 2 ½% gum tragacanth | Primary voltage of 115 volts stepped up to 345 volts, applied for a period of 10 seconds/1.4–2.9 amperes. | Frankfurter cooked but not as hot as in Examples XXX or XXXI. |
| XXXIV | 5% sodium bicarbonate; 2 ½% gum tragacanth | Primary voltage of 115 volts stepped up to 350 volts, applied for a period of 10 seconds/1.4–3.0 amperes. (Composition allowed to set up on hot dog before cooking) | Frankfurter hot. |
| XXXV | 5% sodium bicarbonate; 2 ½% gum tragacanth | Primary voltage of 115 volts stepped up to 350 volts, applied for a period of 10 seconds/1.2–2.5 amperes. (Configuration whereby frankfurter at one end of bun was outside of roll and the other end of bun was within roll). | Frankfurter warm but not hot. |
| XXXVI | 5% sodium chloride, 2 ½% gum tragacanth | Primary voltage of 115 volts stepped up to 360 volts, applied for 10 seconds/1.8–3.4 amperes. (Composition allowed to set up on frankfurter before commencing cooking). | Frankfurter hot. |
| XXXVII | ½% carboxy methyl cellulose; 5% sodium chloride | Primary voltage of 115 volts stepped up to 365 volts, applied for 10 seconds/1.6–3.6 amperes. | Frankfurter hot. |
| XXXVIII | ½% carboxy methyl cellulose, 5% sodium chloride applied for a | Primary voltage of 115 volts stepped up to 350 volts, period of 10 seconds/1.4–2.6 amperes. | Frankfurter undercooked and warm. |
| XXXIX | ½% carboxy methyl cellulose, 5% sodium chloride | Primary voltage of 115 volts stepped up to 355 volts, applied for a period of 10 seconds/1.5–3.0 amperes. | Frankfurter and bun hot. |
| XL | ½% carboxy methyl cellulose, 5% sodium chloride | Primary voltage of 115 volts stepped up to 360 volts, applied for two 10 second periods/first period 1.5–3.3 amperes, second period 2.6–3.4 amperes. | Frankfurter and bun very, very hot. |
| XLI | 10% sodium chloride, 2 ½% gum tragacanth | Primary voltage of 115 volts stepped up to 340 volts, | Frankfurter and bun hot. |

27

4,016,301

28

-continued

| Example | Gel-Ionized Species Combination | Description of Electrical Energy | Result of Electrical Resistance Cooking |
|---|---|---|---|
| | | applied for a period of 10 seconds/1.5-3.0 amperes. | |
| XLII | 2 ½% gum tragacanth, 10% sodium chloride | Primary voltage of 115 volts stepped up to 345 volts, applied for a period of 10 seconds/1.6-3.4 amperes. (Solution set up on frankfurter prior to electrical resistance cooking). | Frankfurter and bun hot. |
| XLIII | 2 ½% gum tragacanth, 10% sodium chloride | Primary voltage of 115 volts stepped up to 345 volts, applied for a period of 10 seconds/2.0-3.2 amperes. (Entire hot dog coated with composition). | Arcing occurred at 3.2 amps, not serviceable. |
| XLIV | 1% xanthan gum, 5% sodium chloride | Primary voltage of 115 volts stepped up to 340 volts, applied for a period of 10 seconds/1.4-2.5 amperes. (Extra long (8 inches) hot dog). | Frankfurter warm. |
| XLV | 1% xanthan gum, 5% sodium chloride | Primary voltage of 115 volts stepped up to 350 volts, applied for two 10 second periods/ first period 1.6-3.2 amperes; second period 3.2-3.8-2.6 amperes. | Frankfurter hot. |
| XLVI | 2 ½% gum tragacanth, no ionized species | Primary voltage of 115 volts stepped up to 335 volts, applied for a period of 10 seconds/1.4-2.7 amperes. | Frankfurter and bun hot. |
| XLVII | 2 ½% gum tragacanth, no ionized species seconds/1.4-3.2 | Primary voltage of 115 volts stepped up to 335 volts, applied for a period of 10 amperes. | Frankfurter and bun hot. |
| XLVIII | 2 ½% gum tragacanth, 1% sodium chloride | Primary voltage of 115 volts stepped up to 340 volts, applied for a period of 10 seconds/1.4-2.9 amperes. | Frankfurter and bun hot. |
| XLIX | 2 ½% gum tragacanth, 1% sodium chloride | Primary voltage of 115 volts stepped up to 340 volts, applied for two 10 second periods/ first period 1.4-2.8 amperes; second period 3.0-2.8 amperes. | Frankfurter and bun hot. |
| L (Control) | ½% carboxy methyl cellulose, no ionized species | Primary voltage of 115 volts stepped up to 345 volts, applied for a period of 10 seconds/1.4-2.5 amperes. | Frankfurter just warm. |
| LI | ½% carboxy methyl cellulose, no ionized species | Primary voltage of 115 volts stepped up to 340 volts, applied for a period of 10 seconds/1.4-2.4 amperes. | Arced at end of 10-second period; not servicable. |
| LII | ½% carboxy methyl cellulose, | Primary voltage of 115 volts stepped | Arcing at end of second |

| Example | Gel-Ionized Species Combination | Description of Electrical Energy | Result of Electrical Resistance Cooking |
|---|---|---|---|
| | 1% sodium chloride | up to 340 volts, applied for two 10 second periods/ first period 1.4–2.5 amperes, second period 2.5 amperes. | period, not servicable. |
| LIII | ½% carboxy methyl cellulose, 3% sodium chloride | Primary voltage of 115 volts stepped up to 350 volts, applied for two 10 second periods/ first period 1.6–2.9 amperes; second period 3.0 amperes. | Arcing at 8 seconds; not servicable. |
| LIV | 2 ½% gum tragacanth, 10% sodium chloride | Primary voltage of 115 volts stepped up to 355 volts, applied for two 10 second periods/ first period 1.6–3.0 amperes; second period 3.2–3.6 amperes. | Frankfurter and bun very, very hot; no arcing. |
| LV | 2 ½% gum tragacanth, 10% sodium chloride | Primary voltage of 115 volts stepped up to 340 volts, applied for a period of 10 seconds. | Frankfurter cooked well; hot. |

EXAMPLES LVI–LIX

In the following Examples LVI–LIX a hamburger being coated at opposite ends thereof with a coating comprising 2 1/2%, gum tragacanth and 1% sodium chloride (the coating covering 20% of the surface area of the hamburger) weighing 4 ounces is placed in a standard hamburger bun and placed in a polyvinyl chloride thermoformed container as illustrated in FIGS. 6, 7 and 8. Over various periods of time, a primary voltage of 115 volts stepped up to 370–400 volts is applied to the electrical contacts from the electrical energy source which results in flows of various quantities of electric current. The electrical energies applied and the results obtained are set forth in the table below:

| Example | Description of Electrical Energy | Result of Electrical Resistance Cooking |
|---|---|---|
| LVI | Primary voltage of 115 volts stepped up to 380 volts, applied for a period of 15 seconds/1.8–4.4 amperes; 3 seconds/4.4–4.0 amperes (total- 18 seconds). | Arcing at 18 seconds. |
| LVII | Primary voltage of 115 volts stepped up to 385 volts, applied for a period of 15 seconds/3.2–6.2–6.0 amperes. | Very hot, fully cooked hamburger. |
| LVIII | Primary voltage of 115 volts stepped up to 380 volts, applied for two 12 second periods/ first period 3.2–5.8 amperes; second period 5.8–5.4 amperes. | Very, very hot hamburger but arcing at 4 seconds of second period. |
| LIX | Primary voltage of 115 volts stepped up to 390 volts, applied for a period of 12 seconds/3.0–6.0 amperes. | Very hot, fully cooked hamburger, no arcing. |

EXAMPLES LX AND LXI

A pizza slice is cooked using the electrical resistance cooking of this invention after coating the ends of the electrically conducting portion with a composition containing 2½% gum tragacanth, 1% sodium chloride and the remainder water. The container used is made of styrofoam and the configuration is in accordance with FIG. 3. The following table sets forth the variables for electrical energy, time of electrical energy input and results of experiments:

| Example | Description of Electrical Energy | Result of Electrical Resistance Cooking |
|---|---|---|
| LX | Primary voltage of 115 volts stepped up to 370 volts, applied for two 12 second periods/ 0.1–1.0 amperes for first period; 1.2–2.0 amperes for second period. | Pizza warm and cooked. |
| LXI | Primary voltage of 115 volts stepped up to 375 volts, applied for a period of 18 seconds/0.1–2.0 amperes. | Pizza warm and cooked. |

EXAMPLES LXII - LXIV

The following examples show the cooking of corned beef the diametrically opposite ends of which are coated with a composition comprising 2 1/2% gum tragacanth, 1% sodium chloride, remainder being water. Electrical contacts are applied to the portions of the corned beef which are coated with the gum tragacanth and sodium chloride composition. Two slices of corned beef are placed on a bun and cooked in accordance with FIG. 3. The following table sets forth the results obtained when varying electrical energies for varying periods of time are applied to the electrical contacts to the corn beef:

| Example | Description of Electrical Energy | Result of Electrical Resistance Cooking |
|---|---|---|
| LXII | Primary voltage of 115 volts stepped up to 375 volts, applied for a period of 15 seconds/6-9 amperes. | Corned beef and bun very, very hot but arcing at 7 seconds. |
| LXIII | Primary voltage of 115 volts stepped up to 370 volts, applied for a period of 6 seconds/6.2-9.5 amperes. | Corned beef and bun very hot and cooked; no arcing. |
| LXIV | Primary voltage of 115 volts stepped up to 375 volts, applied for a period of 6 seconds/3.2-4.2 amperes. (Only 1 slice of corned beef on bun used). | Corned beef hot and cooked; no arcing. |

EXAMPLES LXV

A 6 inch by three-quarter inch beef frankfurter is coated at each end to the extend of one inch with a warm aqueous solution of 2% agar solution but not containing any ionized species (e.g., sodium chloride). After setting of the gel by cooling the frankfurter is then placed in a bun and the combination frankfurter and bun is placed in a container having electrical contacts attached thereto and connected to a source of electrical energy as illustrated in FIG. 1. Over a period of 18 seconds, a primary voltage of 115 volts stepped up to 340 volts is applied to the electrical contacts from the electrical energy source which results in a flow of from 1.2 up to 3.4 amperes. The electrical contacts, during this time, are in direct contact with those surfaces of the frankfurter that are coated with the agar. No cooking of the frankfurter took place. A similar experiment is carried out with the exception that instead of coating the frankfurter with the 2% agar solution, the agar solution is applied to the electrical contacts over the surface thereof that will be in contact with the frankfurter. Again, no cooking takes place.

As a result of the outcome of the experiments described in Examples A–J and I–LXIV, given the teachings of the Furgal, et al reference and the Theimer, et al U.S. Pat. No. 3,886,290, the results achieved by cooking a food article by using the compositions and food substances of our invention are unexpected, unobvious and advantageous.

What is claimed is:

1. An edible electrically high conducting composition which forms a continuous phase on setting, consisting initially of:
   i. From 86 up to 99.3 weight percent water;
   ii. From 0.5% up to 4.0% by weight of a material selected from the group consisting of agar, xanthan gum, tragacanth, guar gum, gum arabic and algin gum;
   iii. From 0.2% up to 10.0% by weight of an edible ionized species selected from the group consisting of sodium chloride, potassium chloride, ammonium chloride, magnesium chloride, sodium glutamate, potassium glutamate, calcium glutamate, magnesium glutamate, sodium alginate, potassium alginate, calcium alginate and magnesium alginate, sodium bicarbonate, potassium bicarbonate, magnesium bicarbonate and calcium bicarbonate.

2. The edible electrically high conduting composition of claim 1 wherein said gel material is agar and said edible ionic species is sodium chloride.

3. The edible electrically high conducting composition of claim 1 wherein said gel material is tragacanth and said edible ionized species is sodium chloride.

* * * * *